United States Patent
Mentzer

(10) Patent No.: US 6,784,930 B1
(45) Date of Patent: Aug. 31, 2004

(54) ACTIVE PIXEL SENSOR WITH ENHANCED RESET

(75) Inventor: Ray A. Mentzer, Corvallis, OR (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/450,819

(22) Filed: Nov. 29, 1999

(51) Int. Cl.[7] .......................... H04N 3/14; H04N 5/335; H04N 5/235
(52) U.S. Cl. ..................... 348/294; 348/230.1
(58) Field of Search .............................. 348/294, 230.1

(56) References Cited

U.S. PATENT DOCUMENTS

| | | | | |
|---|---|---|---|---|
| 4,002,824 A | * | 1/1977 | Petrocelli et al. ...... 348/240.99 |
| 4,858,020 A | * | 8/1989 | Homma ...................... 358/451 |
| 5,828,406 A | * | 10/1998 | Parulski et al. .......... 348/220.1 |
| 6,002,429 A | * | 12/1999 | Ochi et al. ............... 348/220.1 |
| 6,493,030 B1 | * | 12/2002 | Kozlowski et al. ......... 348/310 |
| 6,529,236 B1 | * | 3/2003 | Watanabe ................ 348/230.1 |
| 6,583,416 B1 | * | 6/2003 | Villani ........................ 250/332 |
| 2002/0101528 A1 | * | 8/2002 | Lee et al. .................... 348/304 |
| 2003/0193597 A1 | * | 10/2003 | Fossum et al. ............. 348/308 |

* cited by examiner

Primary Examiner—Wendy R. Garber
Assistant Examiner—James Hannett

(57) ABSTRACT

An active pixel sensor arrangement that provides sub-sampling and reset of all pixel cells after sub-sampling. In one embodiment, logic is provided between sampled and non-sampled rows to propagate reset signals to the non-sampled rows when the sampled rows are reset. In another embodiment, reset of non-sampled rows is implemented with control logic.

7 Claims, 1 Drawing Sheet

ACTIVE PIXEL SENSOR WITH ENHANCED RESET

FIELD OF THE INVENTION

The present invention relates to active pixel sensors and, more specifically, to rapid and complete reset of pixel cells within these sensors.

BACKGROUND OF THE INVENTION

Active pixel sensors (APSs) capture digital image data and are often used in digital still cameras, digital video cameras and image copying apparatus, etc. APSs are typically formed of a plurality of pixel cells that each contain a photo-sensitive diode, commonly referred to as a photo diode. Representative APS array sizes include 352 rows× 288 columns (CIF) and 640 rows×480 columns (VGA). Array densities are expected to increase in the future.

Before an image is captured (i.e., before a picture is taken) with an APS, picture parameters for the proposed image are preferably sampled to obtain data for exposure and focus algorithms. These algorithms may achieve auto focusing, white balance, RGB voltage equalization, exposure time/ gain boost adjustment, etc.

Initial picture parameter determination is typically achieved in a process called "sampling" in which the pixels are exposed to the incident light of a proposed image. The amount of time required to read and reset each pixel and calculate the difference between the exposed and reset voltage levels (representative of the intensity of incident light) is, however, disadvantageously long. To reduce this delay, a procedure termed "sub-sampling" has been developed.

In sub-sampling, a smaller portion of the array, or several small portions of the array are exposed during initial picture parameter determination, but not the entire array. A tradeoff is sought between exposing a sufficient number of pixels for accurate sensing and reducing the number of pixels sampled to increase processing time.

If the chosen sub-sampling technique, for example, selects alternate rows or groups of alternate rows, this trade off may be effectively achieved, but not without the introduction of some disadvantageous aspects. One of these disadvantageous aspects is that reset of a "portion" of the array, but not reset of the entire array, produces pixels that have different reset values (due to leakage current and additive reset effects, etc.). This results in an inaccurate APS output signal and the occurrence of these artifacts in the resultant image. This problem is exacerbated when the proposed image is dark. In this instance, only a small amount of photo diode discharge occurs, resulting in an increased reset value (due to additive effect) and greater differences between reset values of sampled and non-sampled pixel cells.

One possible manner of alleviating the problem of different reset values is generation of a global reset signal that would sequentially reset each of the pixel rows. Sequential reset is preferred because simultaneous or parallel reset would produce unacceptably high EMI due to the large number of simultaneous signal transitions. The generation of sequential reset or the like for the entire array, however is disadvantageously long.

Therefore, a need exists for an APS that permits subsampling but which allows rapid and accurate reset of substantially all pixels.

SUMMARY OF THE INVENTION

Accordingly, it is an object of the present invention to provide an APS that permits rapid sub-sampling and reset of substantially all of the pixel cells in the array.

It is another object of the present invention to provide an APS with look ahead (or behind) reset that resets portions of an array not read in a sub-sampling or like operation.

It is also an object of the present invention to provide such an APS that operates in a rapid, low-cost and low-EMI manner.

These and related objects of the present invention are achieved by use of an active pixel sensor with enhanced reset as described herein.

In one embodiment, the present invention includes combinational logic that is provided between sub-sampled rows and non-sub-sampled rows. This logic senses when the circuit is operating in sub-sampling mode and generates reset signals for the non-sampled rows when the sampled rows are reset. This arrangement provides a low-cost, rapid and efficiently implemented manner of providing universal reset following a sub-sampling event.

In another embodiment, reset of the sub-sampled and non-sub-sampled rows after a sub-sampling event may be implemented in the reset control logic at the control logic level.

The attainment of the foregoing and related advantages and features of the invention should be more readily apparent to those skilled in the art, after review of the following more detailed description of the invention taken together with the drawings.

DETAILED DESCRIPTION

Figure 1:
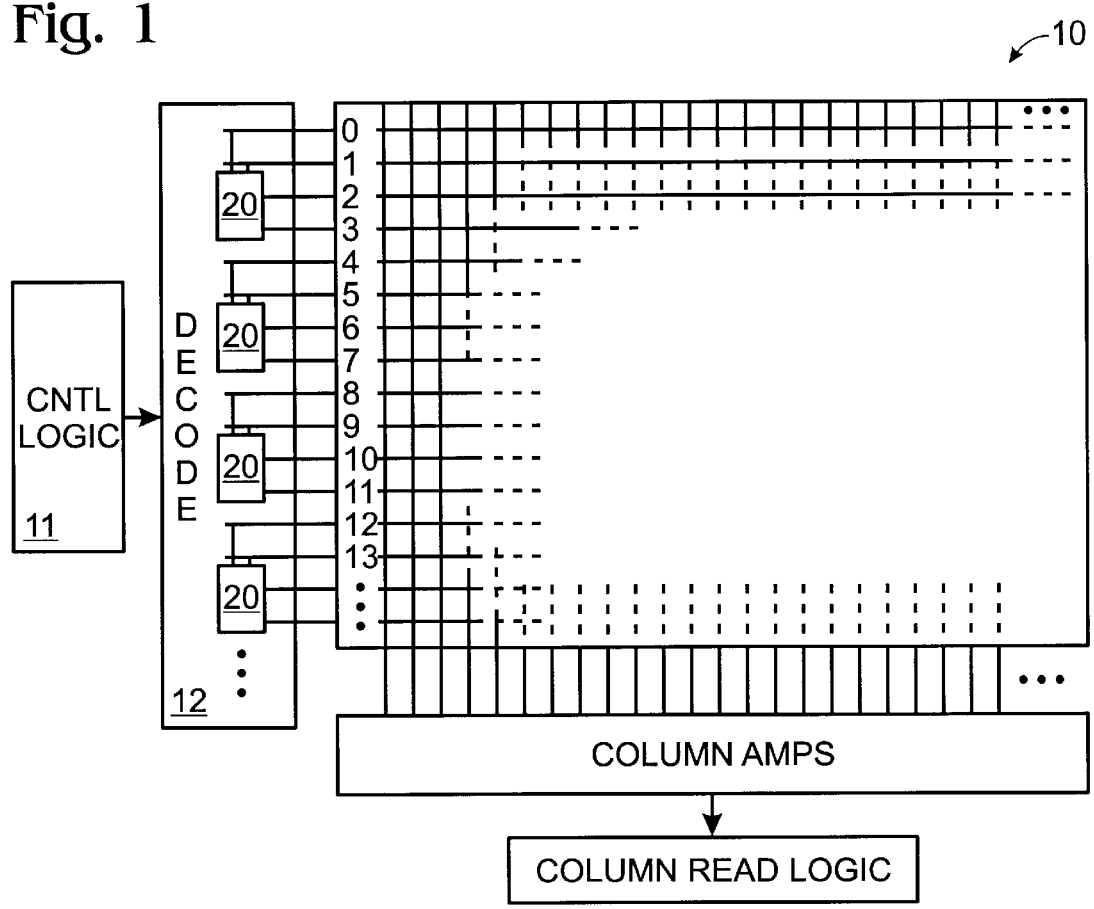
FIG. 1 is an active pixel sensor (APS) in accordance with the present invention.

Referring to FIG. 1, a diagram of an active pixel sensor (APS) 10 in accordance with the present invention is shown. APS 10 is preferably an array of N rows×M columns, where N and M are positive integers. A pixel cell is provided at the intersection of each row and column and each pixel cell preferably receives a reset, row select, and column or read signal, etc., as is known.

APS 10 illustrates one representative embodiment of the present invention and, more specifically, a manner of conducting sub-sampling while providing rapid, universal reset of the entire array after sub-sampling.

Block 11 represents row select and reset signal control logic and block 12 represents row and reset signal decode logic. Suitable control and decode logic for timely generation and processing of row select and reset signals is known in the art. In sub-sample mode, logic 12 propagates a row select and reset signal to each of rows 0,1,4,5,8,9,12,13, etc. Rows 2,3,6,7,10,11, etc., are not used in sub-sampling (for reasons discussed above).

Logic 20 preferably causes a reset of rows not read during the sub-sampling procedure. The reset signals generated by logic 20, are generated substantially at the same time as the reset signals for the read rows.

In one embodiment of the present invention, logic 20 is coupled between a number of sub-sampled rows and non-sub-sampled rows, for example rows 0,1 (sub-sampled) and rows 2,3 (not sub-sampled). In response to the issuance of a reset signal on row 0 during sub-sample mode, logic 20 generates a reset signal on row 2. Similarly in response to a reset signal on row 1 during sub-sampling mode, logic 20 generates a reset signal for row 3. Logic 20 (of FIG. 1) thus acts as a look ahead reset mechanism issuing a reset signal at the Nth+2 row in response to receipt of a reset signal at the Nth row. In this manner, the entire APS 10 is reset and this reset is achieved in a rapid manner with minimal EMI generation.

While the embodiment of FIG. 1 represents a look forward reset mechanism, it should be recognized that the auto reset function of the present invention could be embodied in a look behind fashion, for example, with rows 2,3 being sub-sampled and rows 0,1 being reset therewith. It should also be recognized that although N+2 reset is shown in FIG. 1, the auto reset scheme of the present invention could be implemented in any ratio of sub-sampled to non-sub-sampled rows, for example, N+1, N+3, N+2 through 3, N+2 through 8 (or other), etc.

Figure 2:
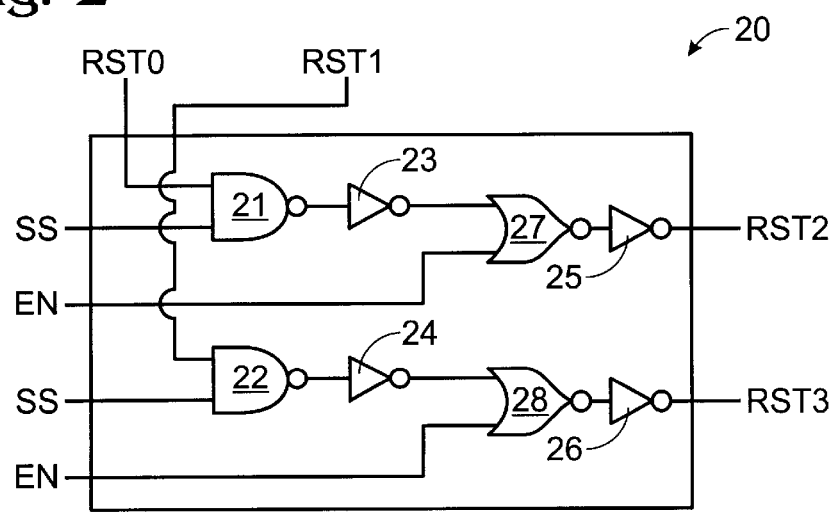
FIG. 2 is a schematic diagram of one embodiment of reset logic in accordance with the present invention.

Referring to FIG. 2, a schematic diagram of one embodiment of reset logic 20 in accordance with the present invention is shown. Logic 20 receives row reset signals from sub-sampled rows, for example, rows 0,1, and includes combinational logic that processes these signals to generate reset signals for non-sampled rows, for example, rows 2,3, respectively.

Logic 20 includes two NAND gates 21,22, four inverters 23–26 and two NOR gates 27,28. The row 0 reset signal (RST0) is gated through NAND gate 21 when the sub-sample mode (SS) signal is present. The output of gate 21 is gated by an array enable (EN) signal at NOR 27 and inverted to form the row 2 reset signal, RST2.

Similarly, the row 1 reset signal (RST1) is gated through NAND gate 22 when the sub-sample mode signal is present. The output of gate 22 is gated by the enable signal at NOR gate 28 and inverted to form the row 3 reset signal, RST3.

Logic 20 may be repeated many times, for example in APS 10 of FIG. 1, to provide the desired reset of non-sampled rows. The combinational logic within logic 20 may also be multiplied to provide auto-reset of an increased number of rows.

It should be noted that the auto-reset taught herein may be implemented in row select and reset signal control logic 11 by being programmed into the software, firmware or hardware of that logic.

The auto reset features of the present invention are applicable to conventional APSs and those utilizing serpentine row select and/or reset signal propagation as taught by U.S. patent application Ser. No. 09/371,745 by Ray Metzer, entitled Improved Digital Imaging Circuit and Method.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. An active pixel sensor circuit, comprising:
  a plurality of pixel cells arranged in a plurality of rows having at least a first portion including at least a first distinct grouping of rows, and a second portion including at least a second distinct grouping of rows, the second portion being distinct from the first portion;
  sampling logic that reads said first portion during a sub-sampling mode of operation; and
  reset logic that resets both said first portion and said second portion after a read of said first portion during sub-sampling mode, wherein said reset logic includes supplemental reset logic between at least a first row of said first grouping and a second row of said second grouping, said supplemental reset logic propagating, during sub-sampling mode, a reset signal to said second row in response to receipt of a reset signal for said first row.

2. The circuit of claim 1, wherein said reset logic includes a plurality of supplemental reset logic circuits each capable of propagating a reset signal to one of the rows in said second grouping in response to receipt of a reset signal for a corresponding row of said first grouping.

3. The circuit of claim 1, wherein said plurality of pixel cells are arranged in a plurality of rows and wherein for every row N that is read and reset, said reset logic propagates a reset signal for row N+X, where X is an integer.

4. The circuit of claim 3, wherein X is a positive integer.

5. An active pixel sensor circuit, comprising:
  a plurality of pixel cells arranged in a plurality of rows, each row having a corresponding row select and reset line, and said plurality of rows including at least row N and row N+X, where N and X are integers; and
  reset propagation logic coupled between the reset line of row N and the reset line of row N+X that propagates a reset signal on the reset line of row N+X in response to receipt of a reset signal on the reset line of row N, wherein said reset propagation logic includes logic responsive to a sub-sampling mode signal that functions in such a manner as to enable said reset propagation logic when a sub-sampling mode signal is present.

6. The circuit of claim 5, wherein X is an integer between 1 and 8.

7. The circuit of claim 5, wherein X is a positive integer.

* * * * *